Figure 1:
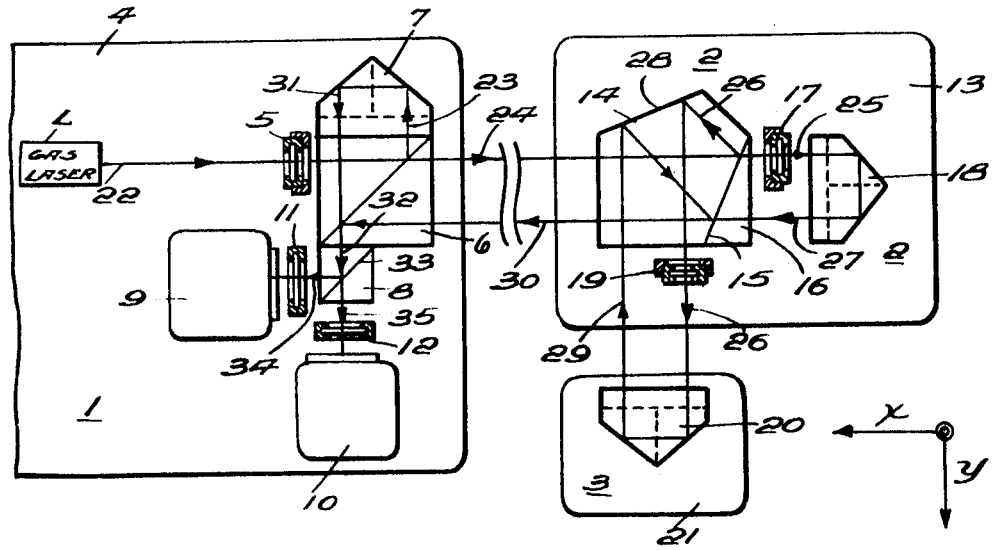

United States Patent

[11] 3,612,694

[72] Inventors Francois Mottier;
Friedrich Karl Von Willisen, both of Zurich, Switzerland
[21] Appl. No. 786,235
[22] Filed Dec. 23, 1968
[45] Patented Oct. 12, 1971
[73] Assignee Aktiengesellschaft Brown, Boveri & Cie Baden, Switzerland
[32] Priority Jan. 31, 1968
[33] Switzerland
[31] 1490

[54] ARRANGEMENT FOR INTERFEROMETRIC MEASUREMENT OF TWO LENGTHS
4 Claims, 2 Drawing Figs.

[52] U.S. Cl. .................................................. 356/110, 356/114, 356/152
[51] Int. Cl. .................................................. G01b 9/02
[50] Field of Search ..................................... 356/4, 5, 106, 110, 114, 152

[56] References Cited
UNITED STATES PATENTS
3,409,376 11/1968 French et al ................. 356/110
3,503,682 3/1970 Botcherby .................... 356/114

Primary Examiner—Rodney D. Bennett, Jr.
Assistant Examiner—S. C. Buczinski
Attorney—Pierce, Scheffler & Parker ABSTRACT: An arrangement for simultaneous interferometric measurement of a plurality of lengths utilizes a single monochromatic circularly polarized light beam which is divided up by intensity in a first optical divider into an outgoing reference beam and an outgoing primary measuring beam. This measurement beam is then divided up by intensity in a second optical divider after traversing one of the lengths to be measured into a pair of outgoing secondary measurement beams which are then polarized in mutually perpendicular planes of polarization. One of these outgoing secondary measurement beams is reversed and returned to the second optical divider and the other outgoing secondary measurement beam is also similarly reversed and returned but after it has traversed the second length to be measured. The two returning secondary measurement beams are then recombined in the second optical divider and returned to the first optical divider where they are combined with the reference beam which has been reversed and returned thus to form an outgoing light beam which is differently intensity-modulated in two mutually perpendicular planes of polarization. This outgoing light beam is then divided up in a third optical divider into a pair of modulated light beams which are then delivered respectively to photodetectors. One photodetector receives only the component of the modulated light beam which is polarized in one plane and the other photodetector receives only the component which is polarized in the other plane.

PATENTED OCT 12 1971          3,612,694

INVENTORS
Francois Mottier
Friedrich Karl Von Willisen

BY Pierce, Scheffler + Parker
ATTORNEYS

ARRANGEMENT FOR INTERFEROMETRIC MEASUREMENT OF TWO LENGTHS

The present invention relates to an improved arrangement for interferometric measurement of two lengths utilizing monochromatic light beams. The light beams are divided up by intensity into reference and measuring beams in a divider arrangement and wherein the measuring and reference beams are returned and then combined in the same divider arrangement in order to form intensity-modulated light beams.

In the field of precision length measurement, interferometric methods of measurement have found numerous new fields of application to an increasing extent since the discovery of the laser principle. One of these fields of application is, for example, the calibration and testing of transverse-measuring devices for machine tools. This involves among other matters, the problem of measuring simultaneously, and with a high degree of accuracy, lengths which correspond, for example, to two or more dimensions of coordinate control. In order to solve this problem, it is possible to use a separate laser interferometer for measurement of each length. However, in view of the high cost of a laser interferometer, this solution is relatively expensive.

It is a primary object of the present invention to provide a new arrangement for simultaneous interferometric measurement of two lengths which, while exhibiting equally high accuracy, answers the purpose with considerably less expenditure than what would be the case were a separate laser interferometer to be used for measurement of each length.

The improved arrangement in accordance with the invention is characterized in that only one reference beam and one measuring beam are formed in a first divider device, a circularly polarized light beam being used; the measuring beam is then divided up in a second divider device into two linearly polarized partial measuring beams with mutually perpendicular planes of polarization and each partial measuring beam traverses at least one associated distance in a loop. The returning partial measuring beams are superimposed in the second divider device to form a returning measuring beam which, for its part, forms in the first divider device, together with the returning reference beam, a light beam which is differently intensity modulated in two mutually perpendicular planes of polarization. This light beam is then split up in a third divider device into two partial light beams exhibiting mutually perpendicular polarization which are then fed to associated photodetector devices.

Figure 2:
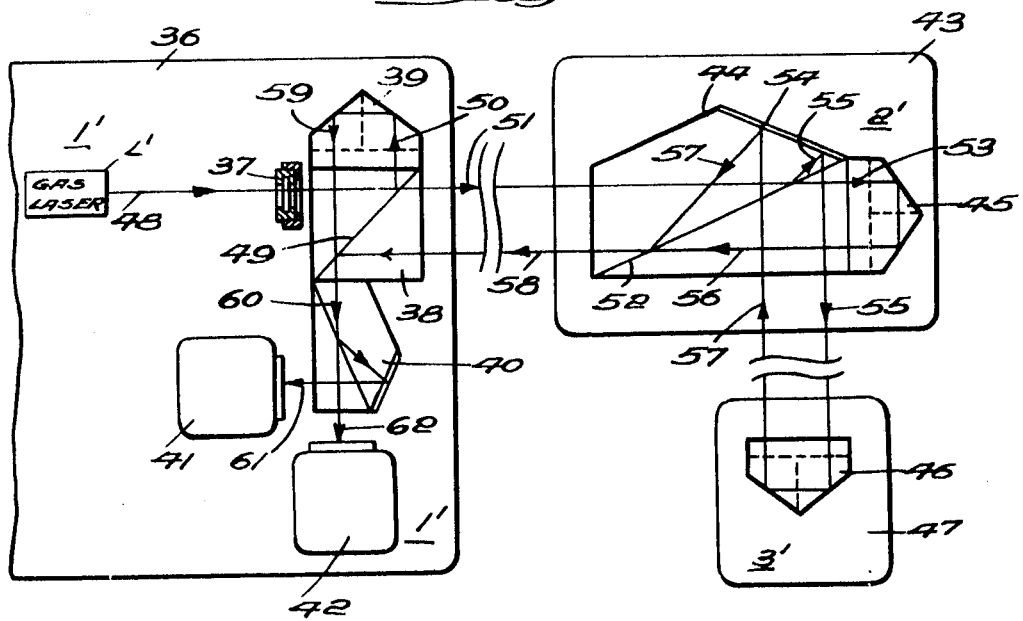

The invention will be explained in detail hereinafter with respect to two different embodiments and the accompanying drawings wherein:

FIG. 1 is a view in plan showing an embodiment wherein a pentaprism is utilized as a beam divider and for directing the paths of the light beams; and FIG. 2 is also a plan view which illustrates a modification of the arrangement illustrated in FIG. 1 in that prisms of the so-called Foster-Seeley type are utilized for beam division and direction control.

With reference now to FIG. 1 there is provided a fixed unit 1 and two units 2 and 3 which are movable with respect to unit 1 in the X direction. Of these movable units the unit 3 is, for its part, furthermore movable in the Y direction relative to the other unit 2. The fixed unit 1 comprises, a baseplate 4 on which are mounted, a first $\lambda/4$ plate 5 rotatably supported in a holder, an input divider cube 6 which is adjoined on two opposite lateral surfaces, on the one hand, by a corner cube prism 7 and, on the other hand, by an output divider cube 8, and photodetector devices 9 and 10, each placed opposite to one of two sides which adjoin one another at right angles of the output divider cube 8. The photodetector devices are provided respectively with polarizing filters 11, 12 arranged in front of their input windows.

The second unit 2 is provided with a penta-prism 14 mounted on a baseplate 13, supplemented to form a divider prism by another prism 16 joined to its first reflecting plane 15. In addition to the divider prism there are, on the one hand, a second rotatably supported $\lambda/4$ plate 17 and a corner cube prism 18 sequentially arranged in the X direction and, on the other hand, a third $\lambda/4$ plate 19 arranged in the Y direction.

The third unit 3 consists essentially of a corner cube prism 20 mounted on a baseplate 21.

For the purpose of the following description of the manner in which the measuring device operates, the axes of the light beams have been designated in the drawing as numbered lines and with arrows applied to the lines to designate the directions in which the beams pass.

A gas laser L is provided and can be mounted on the baseplate 4 of the fixed unit 1. This laser generates a monochromatic coherent and substantially linearly polarized light beam 22 of circular cross section and having a very small angular divergence. This linearly polarized light beam 22 is circularly polarized by means of the $\lambda/4$ plate 5, and is then divided up by intensity in the divider plane of the input beam splitter cube 6 into an outgoing reference beam 23 and an outgoing measuring beam 24. This outgoing measuring beam 24 traverses the measurement distance of the X coordinate to the unit 2, it then passes into the divider prism formed by the penta-prism 14 and prism 16, and is then divided up by intensity on the divider plane 15 of the divider prism into two outgoing partial measuring beams 25, 26. Of these partial measuring beams, the outgoing partial measuring beam 25 proceeding in the X direction is linearly polarized in the Z direction by way of the $\lambda/4$ plate 17 and, after undergoing a reversal of direction in the corner cube prism 18, is guided back as a returning first partial measuring beam 27 to the penta-prism 14. The outgoing second partial measuring beam 26 emerges in the Y direction from the penta-prism 14 after reflection on the plane 28, is then linearly polarized in the $\lambda/4$ plate 19 in the X direction and then traverses the measurement distance of the Y coordinate to the unit 3, where it undergoes a reversal of direction in the corner cube prism 20, and finally passes back to the unit 2 as the returning second partial beam 29.

Following reflection on the plane 28 and on the divider plane 15 in the penta-prism 14, this returning second partial measuring beam 29 combines on the divider plane 15 with the first partial measuring beam 27 returning from the corner cube prism 18 to form a returning measuring beam 30.

The outgoing reference beam 23 undergoes a reversal of direction in the corner cube prism 7 and becomes the returning reference beam 31 which combines in the divider plane of the input divider cube 6 with the returning measuring beam 30 to form a light beam 32 which is differently modulated in two mutually perpendicular planes of polarization, and which for its part is divided up by intensity in the divider plane 33 of the output divider cube 8 into two outgoing modulated partial beams 34, 35 proceeding in the X and Y directions, respectively. The partial beams 34, 35 are each fed respectively by way of polarizing filters 11, 12 to the associated photodetector devices 9 and 10. In this connection, the polarizing filter 11 transmits only those components of the light beam 34 which are polarized in the Z direction, and the polarizing filter 12 transmits only those components of the light beam 35 which are polarized in the X direction.

As will easily be realized, the filtered partial beam 34 received by photodetector device 9 is intensity modulated in accordance with the variation in the X coordinate, and the filtered partial beam 35 received by the photodetector device 10 is intensity modulated in accordance with the variation in the sum (X+Y) of the coordinates, so that a sinusoidal intensity variation corresponding to a full cycle is detected by the associated photodetector devices 9, 10 per variation in length of the magnitude of a half wavelength of the laser light. In order to determine the sense of the variation in length, the phase of the modulation is also detected in addition to the intensity value which, moreover, is the principle in the case of all interferometric length-measuring devices. For this purpose, a wedge-shaped coating is vapor deposited on the path of the rays of the reference beams 23, 31, for example, at the junction of the corner prism 7 with the divider cube 6, this coating having a maximum height amounting to a few wavelengths of the laser light, and shears the wave fronts of the reference beams 23, 31, with respect to those of the modulated light beam 32 and of the partial beams 34, 35. Each of the photodetector devices 9, 10 consists of a pair of photodetectors having their input slots disposed on a common plane which is illuminated in each case by the associated partial beam 34 or 35. The input slots are parallel to these intensity maxima, and are mutually offset in a direction perpendicular to the extent of the slot by a quarter of the distance between two such neighboring maxima. The sign or sense of the variation in length is determined in a phase discriminator from the phase of the signals from the two photodetectors, and the direction of counting of an associated bidirectional counter is controlled in accordance with this sign, signal pulses delivered by one of the photodetectors and corresponding to the intensity maxima being counted with the correct sign in the counter.

In the arrangement which has been described, variations in the state of one counter are thus proportional to variations in the X coordinate, and those of the other counter are proportional to variations in the sum (X+Y) of the coordinates.

A modified embodiment illustrated in FIG. 2 produces the same end result as that obtained with the embodiment illustrated in FIG. 1 but is achieved by use of a somewhat different prismatic arrangement. The arrangement of FIG. 2, analogously to the embodiment of FIG. 1, consists of three units 1', 2' and 3' corresponding to the units 1 to 3 of FIG. 1. The fixed, or stationary unit 1' includes a gas laser L' mounted on baseplate 36, a first λ/4 plate 37 rotatably supported in a holder, an input divider cube 38 adjoined on two opposite lateral surfaces, on the one hand, by a corner cube prism 39 and, on the other hand, by a first Foster-Seeley calcite prism 40, and photodetector units 41, 42 each facing one of the two sides of the Foster-Seeley prism 40 and adjoining one another at right angles. In the unit 2', a second Foster-Seeley prism 44 is arranged on a baseplate 43, and has a corner cube prism 45 joined to it in the X direction. The third unit 3', like that of FIG. 1, consists of a corner cube prism 46 mounted on a baseplate 47.

The arrangement illustrated in FIG. 2 operates in the following manner.

The gas laser L' produces a linearly polarized light beam 48 which passes through λ/4 plate 37 in which it is circularly polarized, thence into input divider cube 38 where it is divided up by intensity on the divider plane 49 thereof into an outgoing reference beam 50 and an outgoing measuring beam 51. The outgoing measuring beam 51 traverses the measurement distance of the X coordinate to the unit 2' where it enters the second Foster-Seeley prism 44, and is divided up therein at the divider plane 52, on the one hand, and into an outgoing first measuring beam 53 proceeding in the X direction and, on the other hand, into an outgoing second measuring beam 55 which proceeds in the Y direction following reflection on the divider plane 52 and on the plane 54. By virtue of the properties of a Foster-Seeley prism, the outgoing first partial measuring beam 53 is linearly polarized in the Z direction, but the outgoing second partial measuring beam 55 is linearly polarized in the X direction. The outgoing first partial measuring beam 53 proceeding in the X direction is guided back to the divider plane 52 of the Foster-Seeley prism 44 as the returning first partial measuring beam 56 after having undergone a reversal of direction in the corner cube prism 45. The outgoing second partial measuring beam 55 proceeding in the Y direction traverses the measurement distance of the Y coordinate to the unit 3' where it undergoes a reversal of direction in the corner cube prism 46, and passes as the returning second partial measuring beam 57 back to the unit 2' where, following reflection on the plane 54, and on the divider plane 52, it is combined in the divider plane 52 with the returning first partial measuring beam 56 to form a measuring beam 58 returning in the X direction. This returning measuring beam 58 finally traverses the measurement distance of the X coordinate back to the unit 1'.

The outgoing reference beam 50 undergoes a reversal of direction in the corner cube prism 39 and becomes the returning reference beam 59, which combines in the divider plane 49 of the input divider cube 38 with the returning measuring beam 58 to form a light beam 60 which is differently modulated in two mutually perpendicular planes of polarization.

The light beam 60 is divided up in the first Foster-Seeley prism 40 into two outgoing modulated partial beams 61, 62 proceeding in the X direction and in the Y direction, respectively and each serving to illuminate an associated photodetector device 41, 42. By virtue of the action of the Foster-Seeley prism 40, the outgoing partial beam 61 proceeding in the X direction is linearly polarized in the Y direction, and the outgoing partial beam 62 proceeding in the Y direction is linearly polarized in the Z direction.

By analogy with the embodiment illustrated in FIG. 1, it follows from this that the output beam 62 received by the photodetector device 42 is intensity modulated in accordance with the variation in the X coordinate, and the output beam 61 received by the photodetector device 41 is intensity modulated in accordance with the variation in the sum (X+Y) of the coordinates. The signals from the photodetector devices 41, 42 are evaluated in the same manner as in the case of the embodiment according to FIG. 1.

We claim:

1. In an arrangement for simultaneous interferometric measurement of two lengths by light beams, the combination comprising means producing a circularly polarized monochromatic light beam, a first beam divider into which said polarized light beam is directed and which produces one outgoing reference beam and one outgoing primary measuring beam, a second beam divider into which said primary measuring beam is directed after traversing a first one of said lengths to be measured, said second divider producing a pair of outgoing secondary measuring beams, means for respectively linearly polarizing said secondary measuring beams in mutually perpendicular planes of polarization, means for returning one of said linearly polarized secondary beams to said second beam divider, means for returning the other of said linearly polarized secondary measuring beams to said second beam divider after traversing the second of said lengths to be measured, said returning secondary beams being superimposed in said second divider and returned to said first divider as a combined measuring beam after again traversing said first length to be measured, means for returning said outgoing reference beam to said first beam divider, said returning reference beam and said combined measuring beam being superimposed in said first beam divider to form an outgoing light beam which is differently intensity modulated in two mutually perpendicular planes of polarization, a third beam divider into which said outgoing light beam is directed, said third beam divider producing a pair of outgoing modulated light beams, and a pair of photodetector devices, said photodetector devices being arranged to receive respectively the different components of the modulated light beam which are polarized in the said two different planes of polarization.

2. An arrangement as defined in claim 1 for simultaneous interferometric measurement of two lengths wherein said first beam divider is constituted by a divider cube, wherein said second beam divider is constituted by a penta-prism supplemented by a prism, wherein said means for linearly polarizing said second measuring beams are constituted respectively by a λ/4 plate, wherein said third beam divider is constituted by another divider cube, and wherein polarized filters are interposed in the beam paths between last said divider cube and said photodetector devices.

3. An arrangement as defined in claim 2 for simultaneous interferometric measurement of two lengths wherein said means for returning said linearly polarized secondary measuring beams as well as for returning said outgoing reference beam are each constituted by corner cube prisms.

4. An arrangement as defined in claim 1 for simultaneous interferometric measurement of two lengths wherein said first beam divider is constituted by a divider cube, and wherein said second and third beam dividers are constituted by Foster-Seeley prisms.